United States Patent
Tadas et al.

(10) Patent No.: US 12,111,187 B2
(45) Date of Patent: Oct. 8, 2024

(54) INDUCTIVE POSITION SENSOR WITH COIL CONFIGURATION

(71) Applicant: Sensata Technologies, Inc., Attleboro, MA (US)

(72) Inventors: Harshad V. Tadas, Franklin, MA (US); Thomas A. Simbron, Cumberland, RI (US)

(73) Assignee: SENSATA TECHNOLOGIES, INC., Attleboro, MA (US)

(*) Notice: Subject to any disclaimer, the term of this patent is extended or adjusted under 35 U.S.C. 154(b) by 0 days.

(21) Appl. No.: 17/939,185

(22) Filed: Sep. 7, 2022

(65) Prior Publication Data

US 2023/0087139 A1    Mar. 23, 2023

Related U.S. Application Data

(60) Provisional application No. 63/245,249, filed on Sep. 17, 2021.

(51) Int. Cl.
    *G01D 5/20* (2006.01)
(52) U.S. Cl.
    CPC ......... *G01D 5/2073* (2013.01); *G01D 5/2086* (2013.01)
(58) Field of Classification Search
    CPC ............................ G01D 5/2073; G01D 5/2086
    See application file for complete search history.

(56) References Cited

U.S. PATENT DOCUMENTS

| | | | | |
|---|---|---|---|---|
| 4,870,391 A | * | 9/1989 | Cooper | G08B 13/2471 340/572.5 |
| 5,293,980 A | * | 3/1994 | Parker | G07D 5/08 194/317 |
| 6,501,276 B1 | * | 12/2002 | Bosnar | G01V 3/165 324/330 |
| 6,593,730 B2 | * | 7/2003 | Zapf | G01D 5/2275 324/207.17 |
| 6,967,574 B1 | * | 11/2005 | Nelson | F41H 11/16 340/552 |

(Continued)

FOREIGN PATENT DOCUMENTS

| | | |
|---|---|---|
| GB | 2417088 A | 2/2006 |
| WO | 2006016147 A2 | 2/2006 |

OTHER PUBLICATIONS

European Search Report issued in related Application Serial No. 22196245.9-1001 on Jan. 26, 2023.

(Continued)

*Primary Examiner* — Walter L Lindsay, Jr.
*Assistant Examiner* — Milton Gonzalez
(74) *Attorney, Agent, or Firm* — Mark H. Whittenberger; Holland & Knight LLP

(57) ABSTRACT

Coil configurations for sensing devices, and related methods are directed towards a sensor including an inductance-capacitance oscillating circuit. The inductance-capacitance oscillating circuit may include a first coil arranged in parallel with a second coil. The inductance-capacitance oscillating circuit may further include an oscillator in electronic communication with the first coil and the second coil. The first inductance-capacitance oscillating circuit may also include at least one capacitor positioned between the oscillator and at least one of the first coil and the second coil.

13 Claims, 17 Drawing Sheets

(56) References Cited

U.S. PATENT DOCUMENTS

| | | | | |
|---|---|---|---|---|
| 7,012,424 B2* | 3/2006 | Obama | ............... | G06K 7/085 |
| | | | | 324/232 |
| 7,208,946 B2* | 4/2007 | Nakano | ............... | G01V 3/104 |
| | | | | 324/228 |
| 7,323,863 B2* | 1/2008 | Mawet | ............... | G01D 5/2013 |
| | | | | 324/207.16 |
| 8,441,251 B2* | 5/2013 | Thoss | ............... | G01D 5/2073 |
| | | | | 324/207.17 |
| 10,577,001 B2* | 3/2020 | Freise | ............... | B61L 1/167 |
| 2002/0105343 A1 | 8/2002 | Scheible et al. | | |
| 2015/0362340 A1* | 12/2015 | Montagne | ............... | G03F 7/70258 |
| | | | | 324/207.17 |
| 2019/0360839 A1* | 11/2019 | Shao | ............... | H03K 17/97 |
| 2020/0072643 A1* | 3/2020 | Qama | ............... | G01D 5/2053 |
| 2022/0128381 A1* | 4/2022 | Pichler | ............... | G01D 5/2086 |

OTHER PUBLICATIONS

Intention to grant received on the related European Patent Application No. 22196245.9, mailed on Apr. 5, 2024; 6 pages.
Decision to grant in the related European Patent Application No. 22196245.9 on Aug. 16, 2024.

* cited by examiner

INDUCTIVE POSITION SENSOR WITH COIL CONFIGURATION

CROSS REFERENCE TO RELATED APPLICATIONS

This application claims the benefit of U.S. Provisional Patent Application having Ser. No. 63/245,249, filed 17 Sep. 2021, the entire content of which is incorporated herein by reference.

BACKGROUND

A sensor, such as an inductive position sensor, may generate electromagnetic energy. The electromagnetic energy may couple to a portion of the sensor to create conducted emissions or radiate in an associated environment to create radiated emissions. Various industry specifications may advise or require a limited amount of conducted and/or radiated emissions for corresponding industry applications.

SUMMARY OF THE DISCLOSURE

As will be discussed in greater detail below, embodiments of the present disclosure are directed towards coil configurations which may be for sensing devices, and related methods. Embodiments of the present disclosure may include a sensor including a first circuit. The first circuit may include a first coil arranged in parallel with a second coil. The first circuit may further include an oscillator in electronic communication with the first coil and the second coil. The first circuit may also include at least one capacitor positioned between the oscillator and at least one of the first coil and the second coil.

Some or all of the following features may be included. At least one resistor may be positioned between the oscillator and at least one of the first coil and the second coil. A third coil may be positioned proximate to at least one of the first coil and the second coil such that upon introduction of current to at least one of the first coil and the second coil, the third coil becomes coupled to at least one of the first coil and the second coil by mutual inductance coupling. A fourth coil may be positioned proximate to at least one of the first coil and the second coil such that upon introduction of current to at least one of the first coil and the second coil, the fourth coil becomes coupled to at least one of the first coil and the second coil by mutual inductance coupling. At least one of the first coil and the second coil may be a transmit coil. At least one of the third coil and the fourth coil may be a receive coil. The third coil may correspond to a sine waveform and the fourth coil may correspond to a cosine waveform. The oscillator may be implemented via an integrated circuit. The first coil and the second coil may be arranged on a printed circuit board. The first coil may be arranged on a first layer of the printed circuit board and the second coil may be arranged on a second layer of the printed circuit board.

In an embodiment, a method may include arranging, in a first circuit, a first coil in parallel with a second coil. The method may further include providing an oscillator in electronic communication with the first coil and the second coil. The method may also include positioning at least one capacitor between the oscillator and at least one of the first coil and the second coil.

Some or all of the following features may be included. The method may include positioning at least one resistor between the oscillator and at least one of the first coil and the second coil. The method may further include positioning a third coil proximate to at least one of the first coil and the second coil such that upon introduction of current to at least one of the first coil and the second coil, the third coil becomes coupled to at least one of the first coil and the second coil by mutual inductance coupling. The method may also include positioning a fourth coil proximate to at least one of the first coil and the second coil such that upon introduction of current to at least one of the first coil and the second coil, the fourth coil becomes coupled to at least one of the first coil and the second coil by mutual inductance coupling. Arranging the first coil in parallel with the second coil may decrease a corresponding inductance as compared to arranging the first coil in series with the second coil. Decreasing the corresponding inductance may allow for increasing a capacitance of the at least one capacitor without falling below an associated resonance frequency threshold. Meeting or exceeding the associated resonance frequency threshold may allow for increased filtering of a harmonic frequency produced, at least in part, by the oscillator. Increasing the filtering of the harmonic frequency produced, at least in part, by the oscillator may reduce at least one of a conducted emission associated with the oscillator and a radiated emission associated with the oscillator. Reducing at least one of the conducted emission and the radiated emission may allow for maintaining or increasing a signal strength associated with the first circuit. Maintaining or increasing the signal strength may allow for maintaining or increasing accuracy of a sensor comprising the first circuit.

In an embodiment, an inductive position sensor may include an inductance-capacitance (LC) oscillating circuit. The LC oscillating circuit may include a first transmit coil of a first layer of a printed circuit board arranged in parallel with a second transmit coil of a second layer of the printed circuit board. The LC oscillating circuit may further include an oscillator implemented via an integrated circuit. The oscillator may be in electronic communication with the first transmit coil and the second transmit coil. The LC oscillating circuit may also include at least one capacitor and at least one resistor positioned between the oscillator and the first transmit coil and the second transmit coil. The inductive position sensor may further include a first receive coil and a second receive coil positioned proximate to at least one of the first transmit coil and the second transmit coil such that upon introduction of current to at least one of the first transmit coil and the second transmit coil, at least one of the first receive coil and the second receive coil becomes coupled to at least one of the first transmit coil and the second transmit coil by mutual inductance coupling. Arranging the first transmit coil in parallel with the second transmit coil may allow, at least in part, maintaining or increasing accuracy of the inductive position sensor as compared to arranging the first transmit coil in series with the second transmit coil.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

This summary is provided to introduce a selection of concepts that are further described below in the detailed description. This summary is not intended to identify essential features of the claimed subject matter, nor is it intended to be used as an aid in limiting the scope of the claimed subject matter.

BRIEF DESCRIPTION OF THE DRAWINGS

Embodiments of the present disclosure are described with reference to the following figures.

Like reference symbols in the various drawings may indicate like elements.

DETAILED DESCRIPTION

The discussion below is directed to certain implementations. It is to be understood that the discussion below is only for the purpose of enabling a person with ordinary skill in the art to make and use any subject matter defined now or later by the patent "claims" found in any issued patent herein.

It is specifically intended that the claimed combinations of features not be limited to the embodiments and/or implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered a same object or step.

Embodiments of the present disclosure may include a sensor. The embodiments may include one or more coils or sets of coils. For example, the embodiments may include a set of transmit coils and a set of receive coils on a multi-layer printed circuit board (PCB). In some embodiments, transmit coils may be configured in parallel, and the parallel configuration of transmit coils may reduce electromagnetic emissions from the sensor (e.g., an inductive position sensor), while maintaining a signal amplitude associated with the sensor. Such a configuration of transmit coils may provide optimal emissions performance which may benefit accuracy of the sensor.

Figure 1:
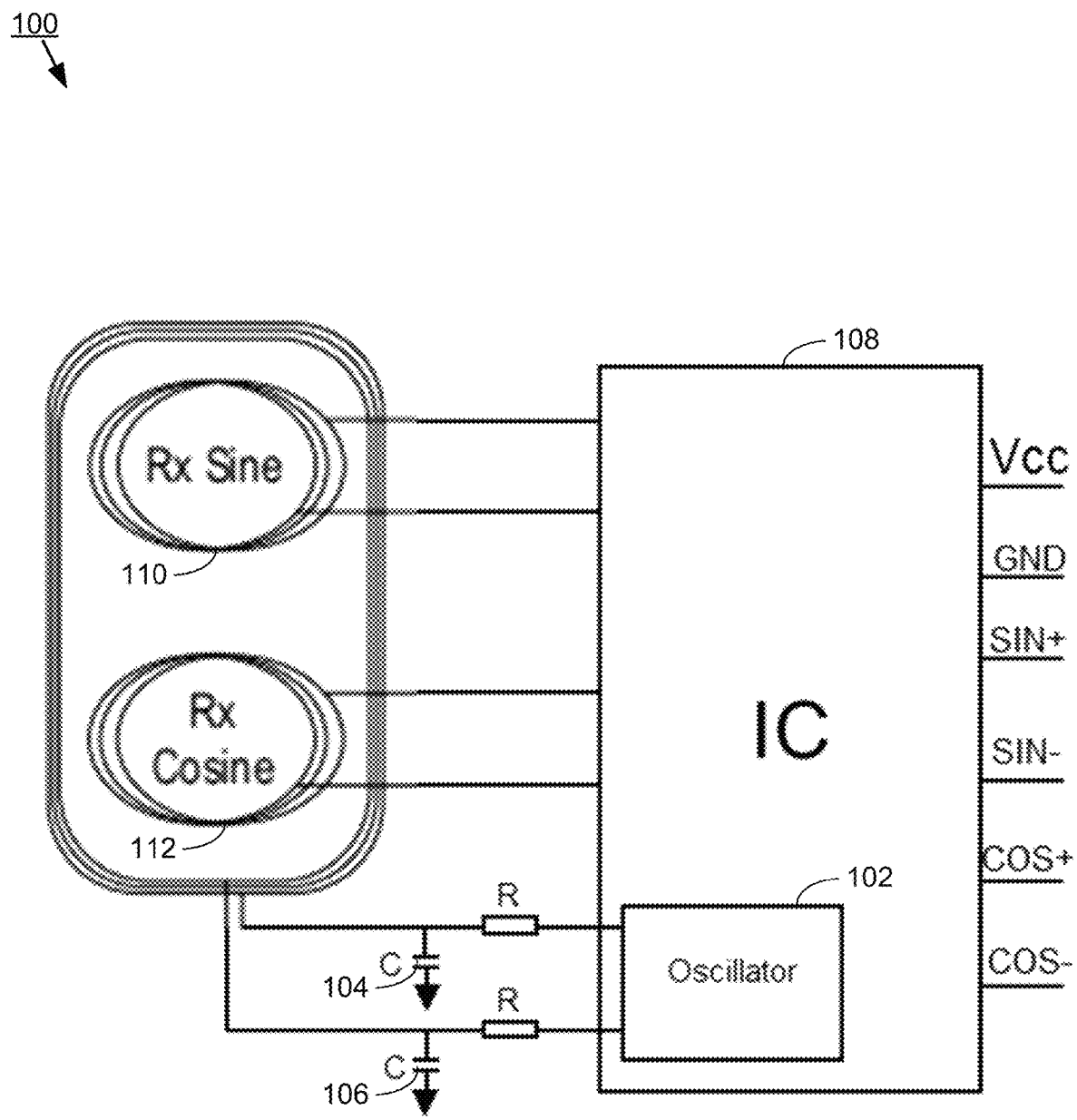
FIG. 1 illustrates example components of a sensor.

Referring to FIG. 1, a diagram illustrating example components of a sensor 100 is shown. In some embodiments, one or more coils (e.g., transmit ("Tx") coils), may be configured with a discrete arrangement of capacitor(s) (e.g., capacitors 104 and 106) to form an inductor-capacitor ("LC") oscillator or oscillating circuit, which may also include an oscillator 102. The LC oscillating circuit shown may be typical for automotive applications and may be driven by an integrated circuit ("IC") 108 and may operate in a range of 2-5 megahertz (MHz). Further, the LC oscillating circuit may generate a magnetic field of varying strength around windings of the transmit coils. The transmit coils may couple onto one or more receive coils (e.g., receive coils 110 and 112) via mutual inductance coupling. For example, receive coils 110 and 112 may be two discrete receive ("Rx") coils corresponding to sine and cosine respectively, and may be arranged on the PCB with a 90 (electrical) degree phase-shift. A sinusoidal output may be generated as a function of a rotor angle because the receive coils 110 and 112 may be geometrically designed as sine and cosine waveforms which have been wrapped around the device by a polar transform.

The LC oscillating circuit formed by the transmit coils and the one or more discrete capacitor may generate electromagnetic energy at a resonance frequency and its harmonics. The electromagnetic energy may couple to a sensor harness, which may be referred to as conducted emissions, or may or radiate in the environment, which may be referred to as radiated emissions. The sensors described herein may be used in automotive applications and various automotive specifications may require or advise that the conducted and/or radiated emissions should be below a required threshold. Some sensor designs, when tested for conducted and/or radiated emissions, may yield results that are above an acceptable threshold.

Figure 2:
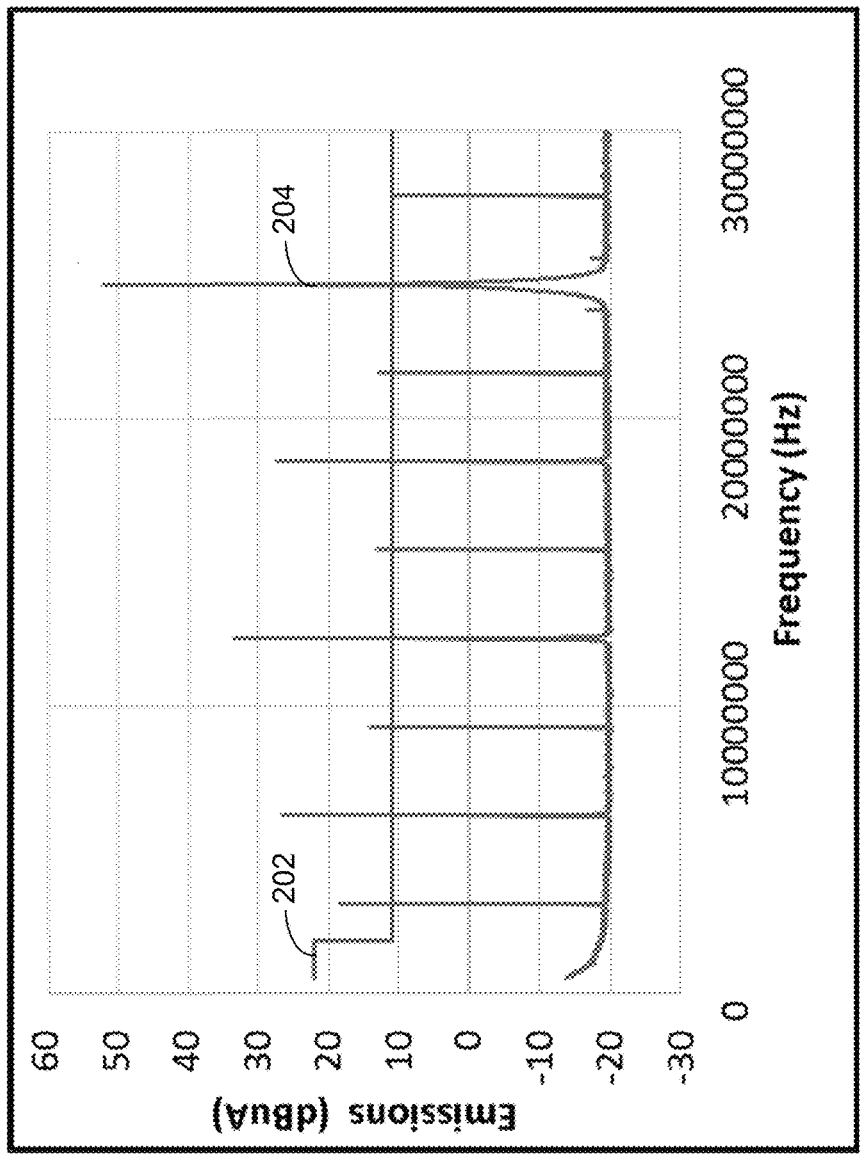
FIG. 2 is a plot illustrating example conducted emissions test results.

Referring now to FIG. 2, a plot 200 showing example conducted emissions test results is shown. The plot 200 may show example conducted emissions test results for a typical LC oscillating circuit formed by transmit coils and a discrete capacitor. The maximum conducted emissions line 202 located at or near 10 and 20 decibels relative to one micro-amp (dBuA) may represent, for example, maximum conducted emissions for an automotive specification. Thus, a typical LC oscillating circuit may generate conducted emissions (e.g., as indicated by values 204) above the required automotive specification.

Figure 3:
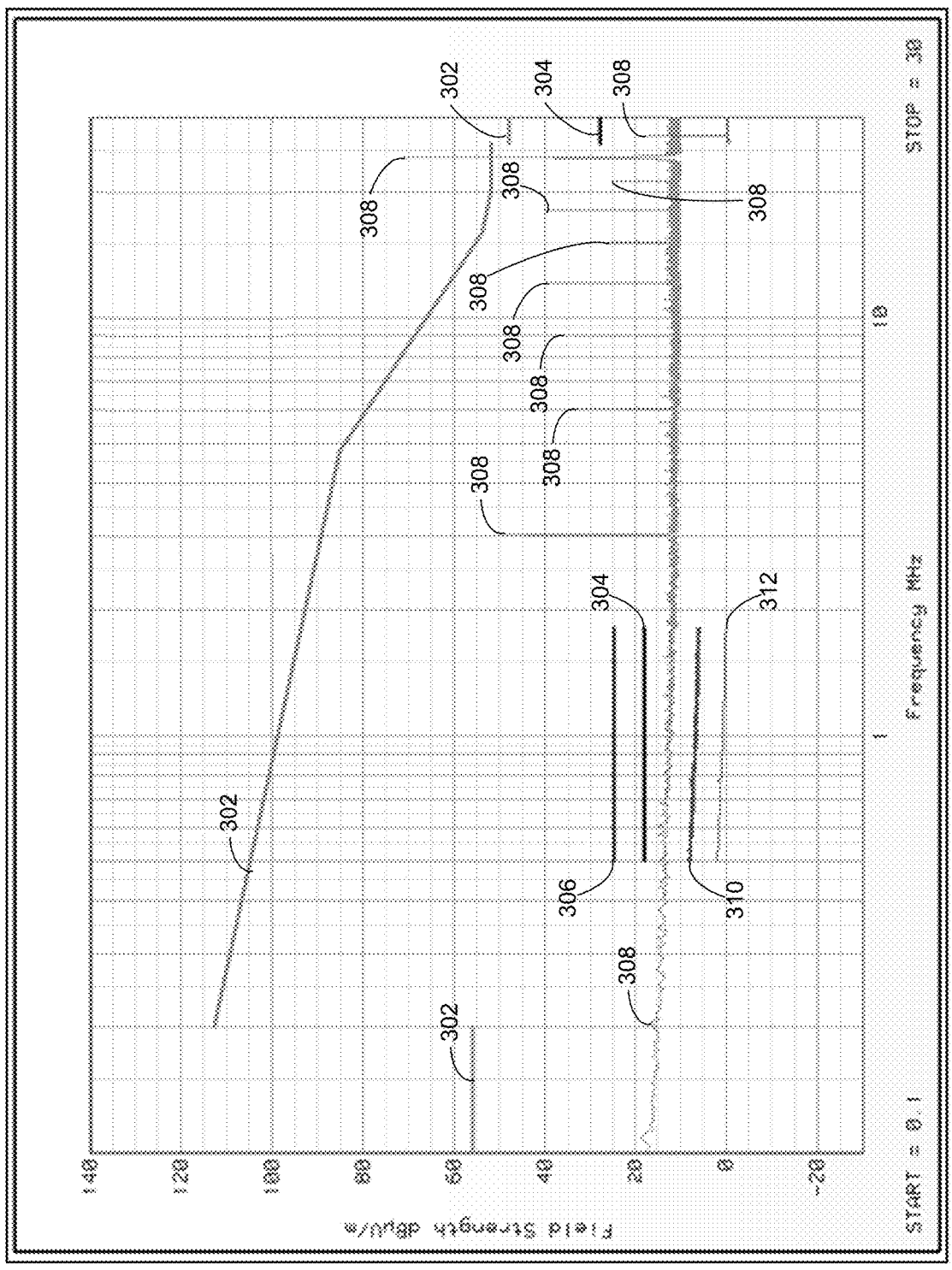
FIG. 3 is a plot illustrating example values of field strength vs. frequency.

Referring now to FIG. 3, a plot 300, illustrating example values of field strength vs. frequency of radiated emissions corresponding to a sensor having a typical LC oscillating circuit, is shown. The plot 300 may show field strength measured in decibel microvolts per meter (dBuV/m) and frequency in MHz. The values 302 may represent peak limit, the values 304 may represent average limit, the values 306 may represent quasi-peak limit, the values 308 may represent peak trace, the values 310 may represent average trace, and the values 312 may represent quasi-peak trace associated with the radiated emissions. In some situations, the radiated emissions of a sensor having a typical LC oscillating circuit may exceed levels required by an automotive specification for automotive applications.

Techniques to reduce conducted and/or radiated emissions may include filtering and/or attenuation of a corresponding transmit signal. Filtering transmit signal harmonics may be accomplished by increasing a resistance or capacitance value. The capacitance value may be inversely proportional to the transmit resonance frequency, and thus the capacitance value may only be increased to a certain extent before the transmit frequency falls below a resonance frequency minimum of 2 MHz (e.g., as may be required by various automotive specifications). Further, the transmit signal amplitude may be reduced by adjusting an oscillator current setting. However, these techniques to reduce conducted and/or radiated emissions (e.g., reducing transmit signal amplitude) may result in unintended consequences such as directly attenuating the receive signal and/or an output analog signal amplitude, which may lead to a reduction in sensor accuracy.

Figure 4:
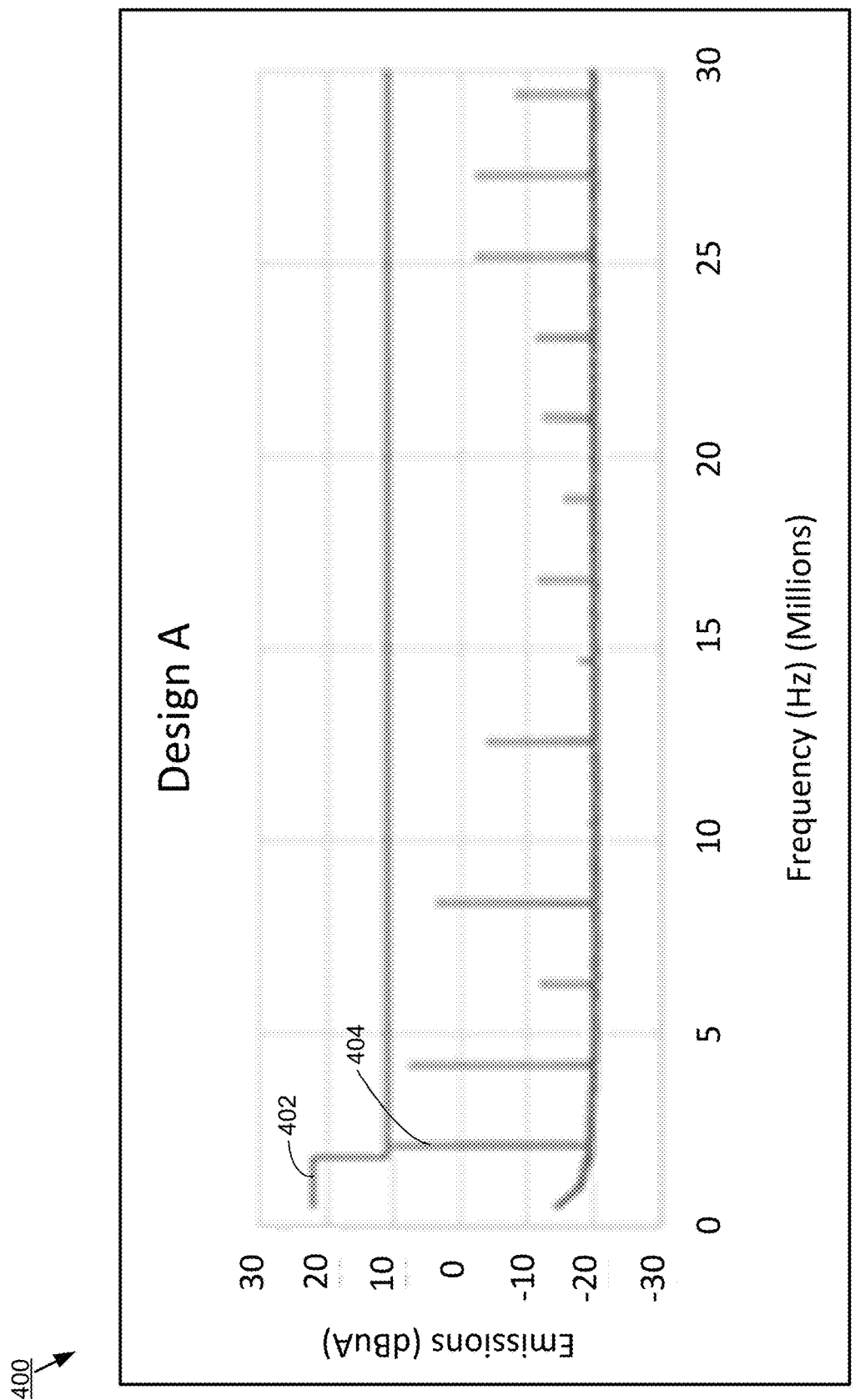
FIG. 4-6 are plots illustrating example conducted emissions results.
Figure 5:
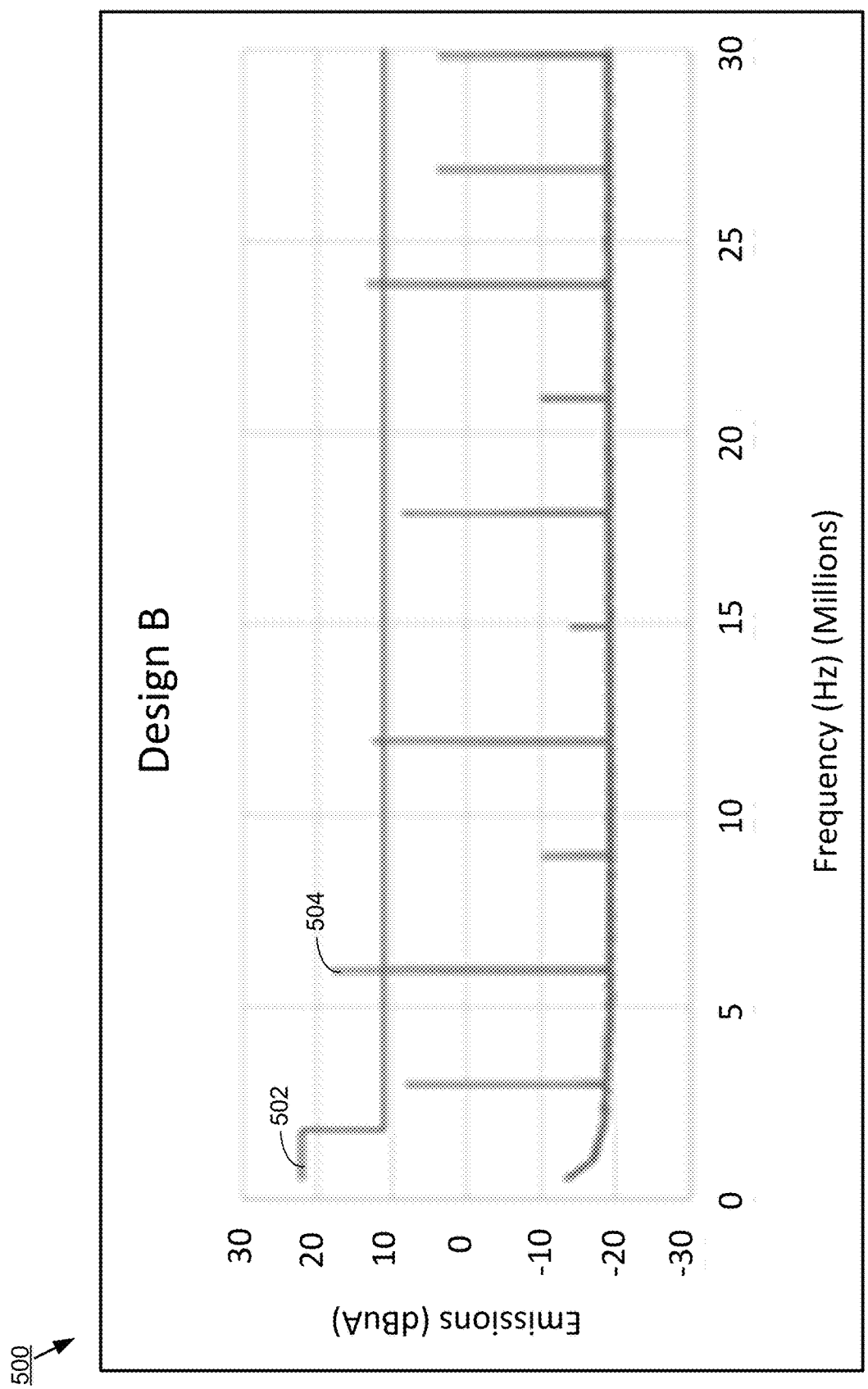
Figure 6:
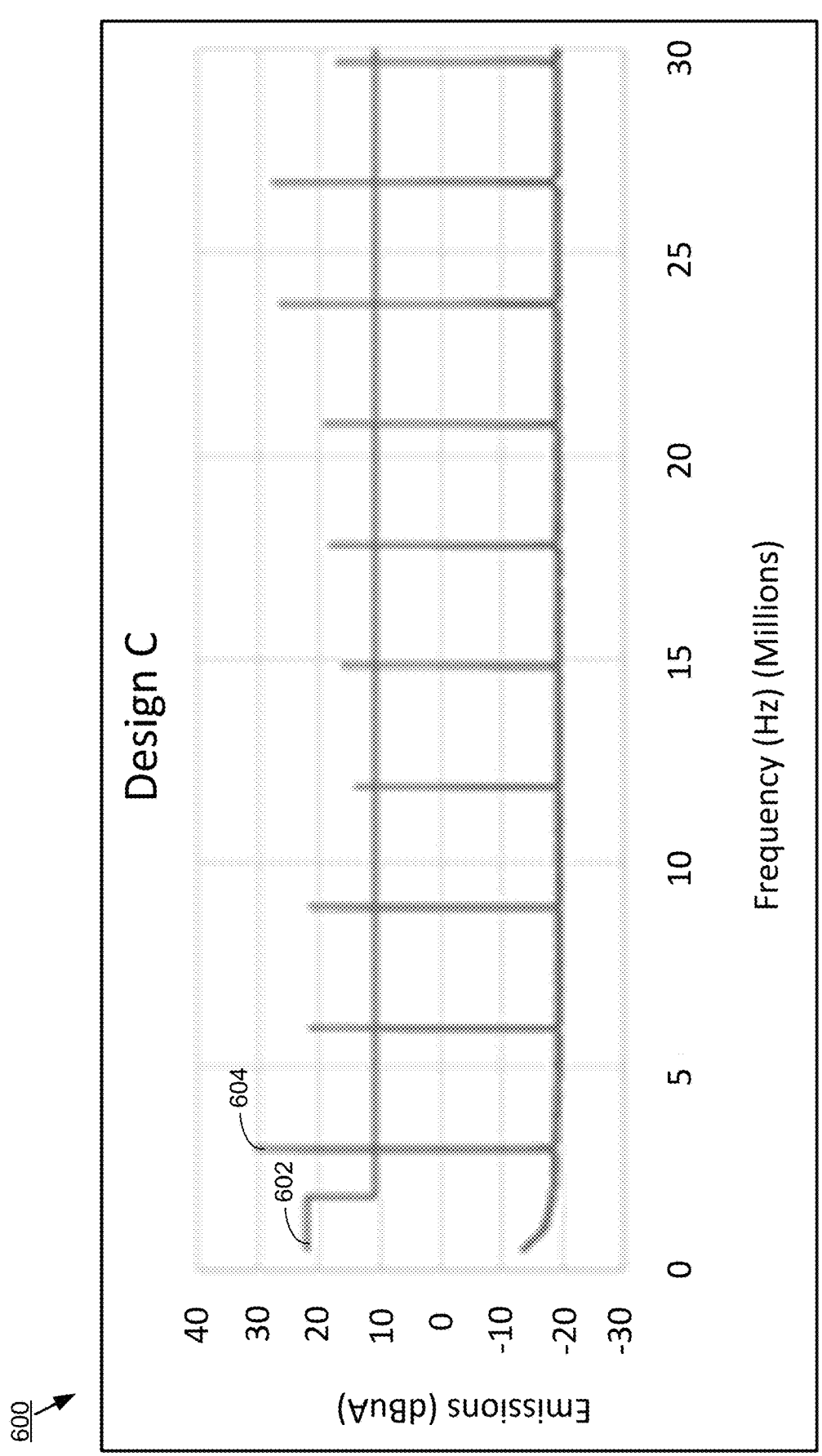
Figure 7:
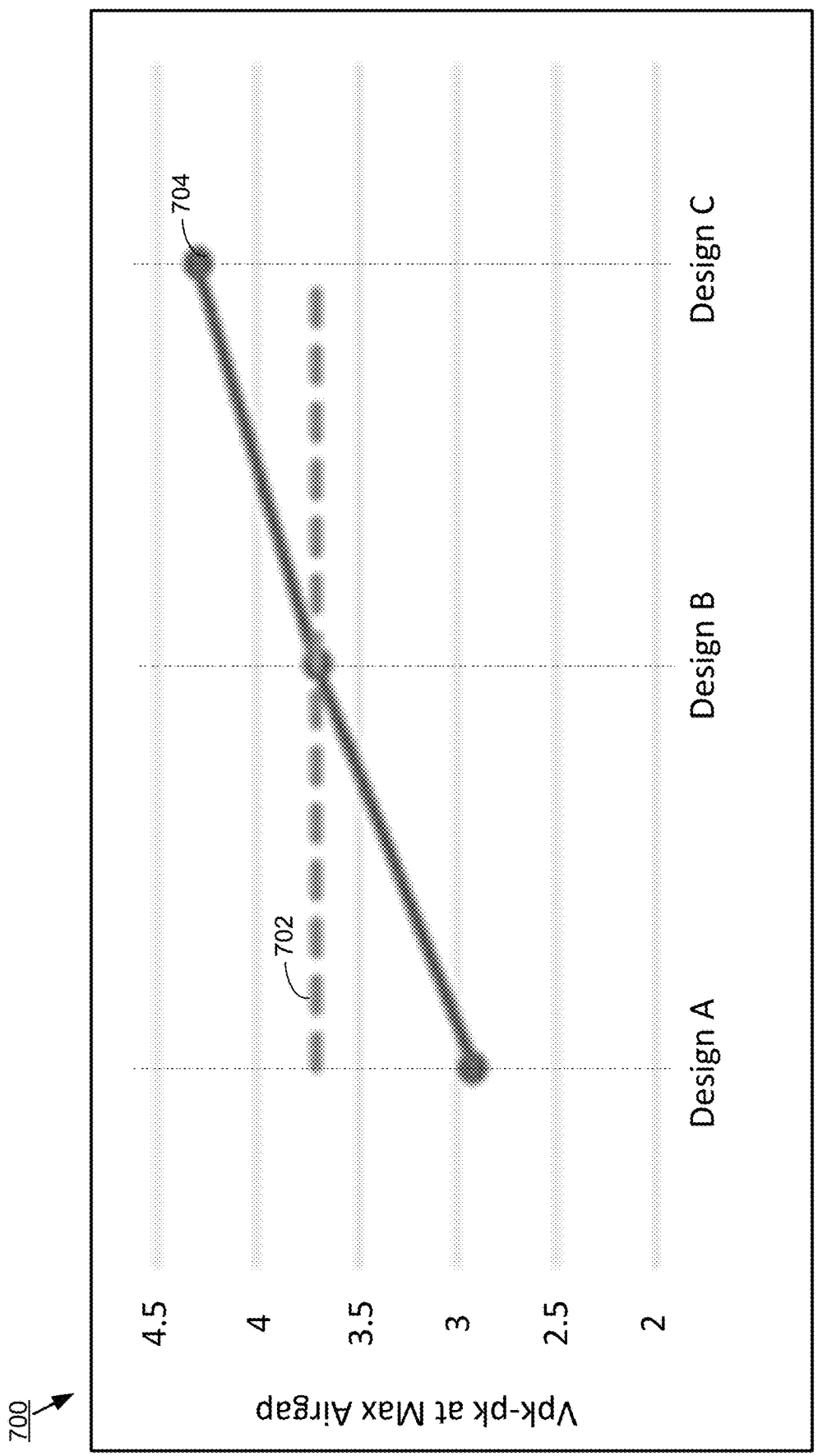
FIG. 7 is a plot illustrating an example conducted emissions trade-off.

Referring to FIGS. 4-6, plots illustrating example conducted emissions results which may be achieved by three designs for reducing conducted emissions (one for each of FIGS. 4-6, respectively) that may incorporate filtering techniques, and resultant amplitude signal strength, are shown. Referring also to FIG. 7, the difficult trade-off of reducing emissions versus achieving output signal strength is illustrated.

Referring to FIG. 4, a first design for reducing conducted emissions, which may be referred to as Design A, may yield the results shown in the plot 400. Design A may be for an LC oscillating circuit and may include a 1000 microamp (uA) signal, 5 transmit loops (e.g., corresponding to an inductor(s) and equaling or providing 6 micro-Henrys (uH)) of inductance), transmit capacitors=1800 pico-Farads (pF), no output ferrites, no R2 (e.g., second resistor) ferrite, wire terminal ferrites (supply and ground), transmit ferrites, and 1 spacer added between the sensor and a target plate. The maximum conducted emissions line 402 located at about 10 and 20 dBuA as shown may represent, for example, maximum conducted emissions for an automotive specification at corresponding signal frequencies. Design A may generate conducted emissions (e.g., as indicated by values 404) near or below the automotive specification limit.

Referring to FIG. 5, a second design for reducing conducted emissions, which may be referred to as Design B, may yield the results shown in the plot 500. Design B may be for an LC oscillating circuit and may include a 1000 uA signal, 5 transmit loops, transmit capacitors=820 pF, supply and ground terminal ferrites, and transmit ferrites. The maximum conducted emissions line 502 located at about 10 and 20 dBuA as shown may represent, for example, maximum conducted emissions for an automotive specification at corresponding signal frequencies. Design B may generate conducted emissions (e.g., as indicated by values 504) at above the automotive specification limit.

Referring to FIG. 6, a third design for reducing conducted emissions, which may be referred to as Design C, may yield the results shown in the plot 600. Design C may be for an LC oscillating circuit and may include a 1000 uA signal, 5 transmit loops, transmit capacitors=820 pF, supply and ground terminal ferrites, and a transmit 10 ohm resistor(s). The maximum conducted emissions line 602 located at about 10 and 20 dBuA as shown may represent, for example, maximum conducted emissions for an automotive specification at corresponding signal frequencies. Design C may generate conducted emissions (e.g., as indicated by values 604) at above the automotive specification limit.

Referring to FIG. 7, a conducted emissions solution tradeoff is illustrated in the plot 700. The plot 700 shows peak to peak voltage for each of Designs A, B, and C. The dashed line 702 may represent a desired (or required) threshold for signal amplitude corresponding to output signal strength and the values 704 may represent a signal amplitude for each of Designs A, B, and C on the X-axis. As discussed above, Design A uses multiple techniques (including implementing higher capacitance than Designs B or C, e.g., at 1800 pF) to reduce conducted emissions. As shown in FIG. 4, the techniques used in Design A yield results below the maximum conducted emissions line 402, but also as shown in FIG. 7, Design A leaves a resulting signal amplitude corresponding to output signal strength below the desired (or required) threshold.

Further, Design B uses a different set of techniques (including transmit ferrites but lower capacitance than Design A, e.g., at 820 pF) to reduce conducted emissions. As shown in FIG. 5, the techniques used in Design B yield results closer to (but often over) the maximum conducted emissions line 502 than Design A, but also as shown in FIG. 7, Design B leaves a resulting signal amplitude corresponding to output signal strength at or near the desired (or required) threshold.

Additionally, Design C uses a another set of techniques (including transmit 10 ohm resistor(s) and lower capacitance than Design A, e.g., at 820 pF) to reduce conducted emissions. As shown in FIG. 6, the techniques used in Design C yield results over the maximum conducted emissions line, but also as shown in FIG. 7, Design C leaves a resulting signal amplitude corresponding to output signal strength above the desired (or required) threshold. Thus, when viewed together, FIGS. 4-7 illustrate the difficult trade-off of reducing emissions versus achieving output signal strength.

Figure 8:
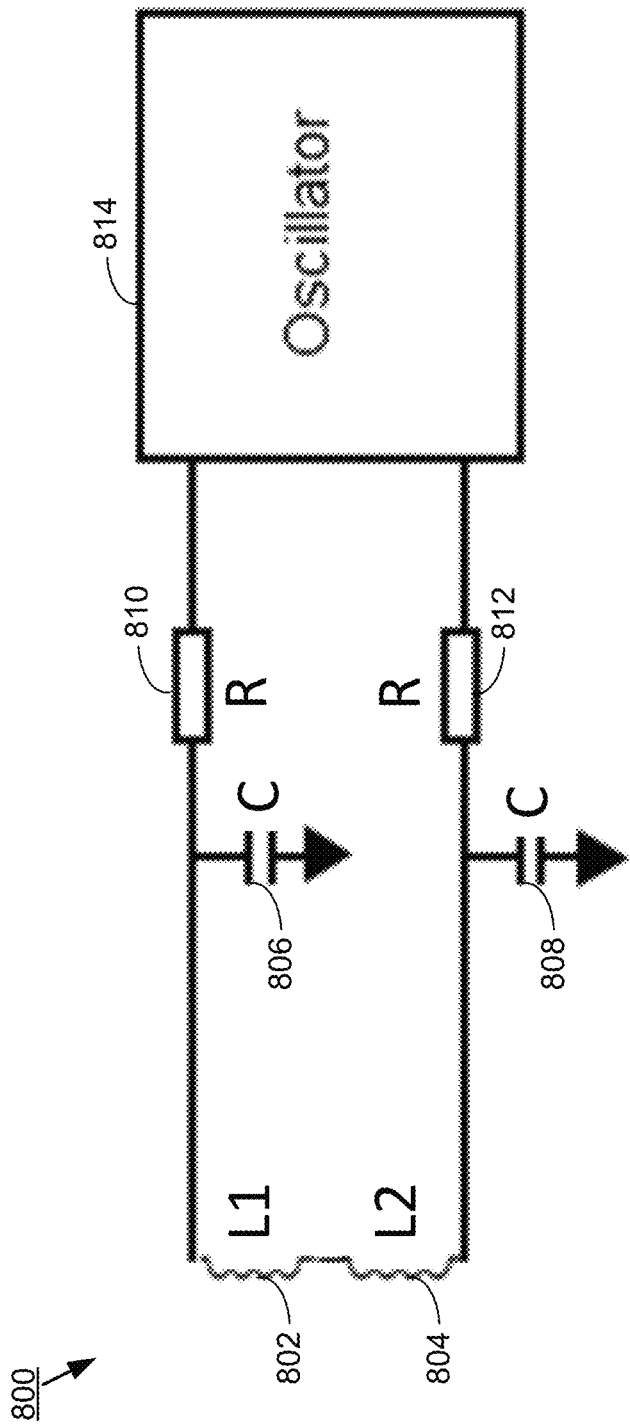
FIG. 8 illustrates example components of a sensor.

Embodiments included herein may address the difficult trade-off by using a parallel transmit coil configuration as is discussed in further detail below. Referring to FIG. 8, example components of a sensor are shown. The components of FIG. 8 may form an LC oscillating circuit 800. An example design technique that may be used for LC oscillating circuits (e.g., for Designs A, B, or C as discussed above) may include two coils (e.g., inductors) 802 and 804 (e.g., L1, and L2, respectively). The LC oscillating circuit 800 may also include one or more capacitors (e.g., capacitors 806 and 808) and one or more resistors (e.g., resistors 810 and 812). Further, the LC oscillating circuit 800 may include an oscillator 814.

The coil 802 may be a transmit coil and may be positioned on a first layer (e.g., layer 1) of a printed circuit board (PCB). Further, the coil 804 may also be a transmit coil and may be positioned on a second layer (e.g., layer 2) of the PCB. Coils 802 and 804 may be arranged in series, which may result in a total inductance=L1+L2. If L1=L2=L, total inductance may be calculated as L1+L2=2*L or 2L. For example, if L1=L2=7 uH, then L=14 uH. For the configuration shown in FIG. 8, the maximum value of capacitance that may be used may be 900 pF in order to meet an application-specific integrated circuit (ASIC) limit for a resonance frequency of 2 MHz. The relationship of frequency to capacitance is provided by equation 1 below:

$$F = \frac{1}{\sqrt{2 * \pi * L * C}} \quad \text{EQUATION 1}$$

For LC oscillating circuits such as the configuration shown in FIG. 8, larger capacitance values may allow for increased filtering of harmonic frequencies. Due to the limited capacitance (e.g., 900 pF) of the configuration of FIG. 8, with coils 802 and 804 arranged in series, the configuration of FIG. 8 may not provide sufficient ability to reduce emissions. Thus, higher capacitance may allow for increased filtering, which in turn may allow for greater ability to reduce emissions.

Figure 9:
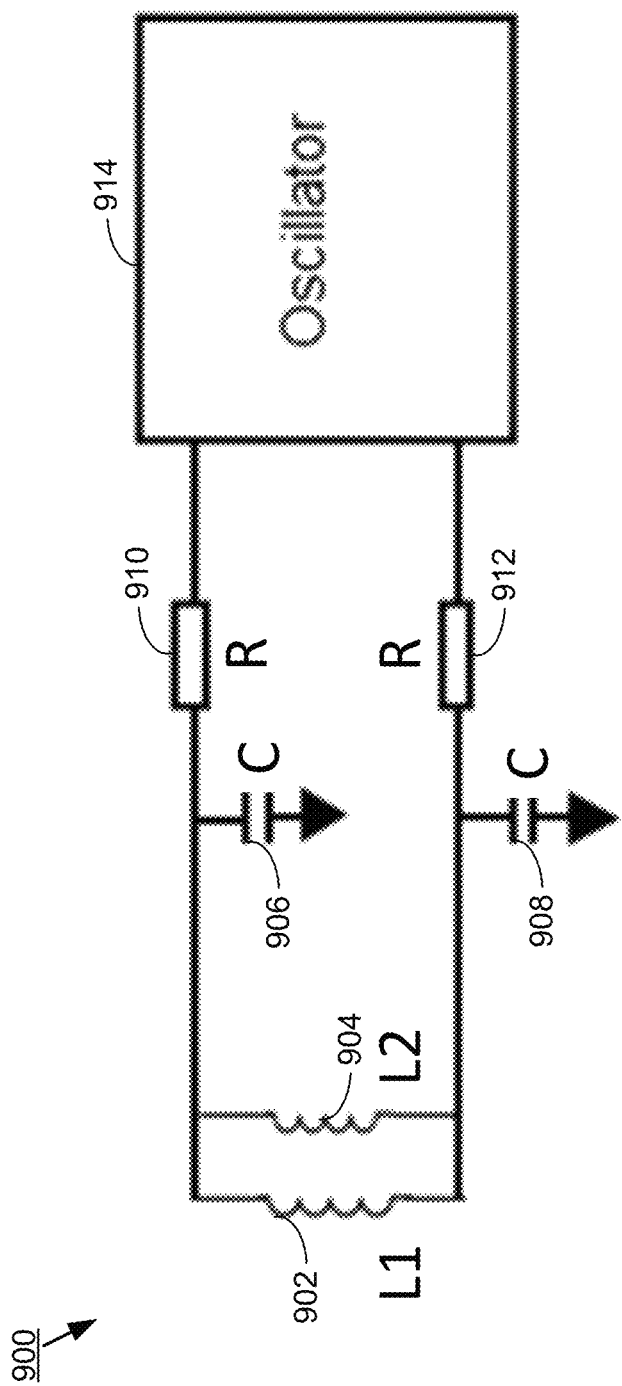
FIG. 9 illustrates example components of a sensor in accordance with embodiments of the present disclosure.

Referring to FIG. 9, example components of a sensor are shown. The components of FIG. 9 may form an LC oscillating circuit 900 which may allow for higher capacitance than the LC oscillating circuit 800. The higher capacitance may allow for increased filtering, which in turn may allow for greater ability to reduce emissions. An example design technique that may be used for LC oscillating circuits may include two coils (e.g., inductors) 902 and 904 (e.g., also shown as L1 and L2, respectively). The LC oscillating circuit 900 may also include one or more capacitors (e.g., capacitors 906 and 908) and one or more resistors (e.g., resistors 910 and 912). Further, the LC oscillating circuit 900 may include an oscillator 914, which may be in electronic communication with the coils 902 and 904. At least one of the capacitors 906 and 908 may be positioned between the oscillator 914 and at least one of the coils 902 and 904. Further, at least one of the resistors 910 and 912 may be positioned between the oscillator 914 and at least one of the coils 902 and 904.

The coil 902 may be a transmit coil and may be positioned on a first layer (e.g., layer 1) of a PCB. Further, the coil 904 may be a transmit coil and may be positioned on a second layer (e.g., layer 2) of the PCB. Coils 902 and 904 may be arranged in parallel, which may result in a total inductance=L1*L2/(L1+L2); L/2=3.5 uH. For the configuration shown in FIG. 9, the maximum value of capacitance that may be used may be 3600 pF in order to meet an ASIC limit for the resonance frequency of 2 MHz. As discussed above, the larger capacitance value for LC oscillating circuit 900 of FIG. 9 (e.g., 3600 pF) may allow for increased filtering of the harmonic frequencies generated by the oscillator (e.g., oscillator 914) than the lower capacitance value for LC oscillating circuit 800 of FIG. 8 (e.g., 900 pF). Thus, arranging the inductors 902 and 904 in parallel (e.g., as shown for the LC oscillating circuit 900 of FIG. 9) may allow for a greater reduction in emissions as compared to arranging the inductors 802 and 804 in series (e.g., as shown for the LC oscillating circuit 800 of FIG. 8).

Accordingly, in some embodiments, the design technique shown in FIG. 9 may include an inductive transmit coil configuration that achieves optimal emissions performance. The coil configuration shown in FIG. 9 may meet functional requirements (e.g., automotive specifications and/or ASIC limitations) and may not cause degradation in sensor signal strength to achieve optimal emissions performance. The parallel transmit coil configuration of FIG. 9 may achieve a low inductance and equivalent series resistance (ESR) value, which may enable use of higher transmit capacitor values (e.g., for capacitors 906 and/or 908) which, in turn, may filter electromagnetic emissions from an inductive position sensor (e.g., comprising the LC oscillating circuit 900 of FIG. 9) while maintaining signal strength.

Figure 10:
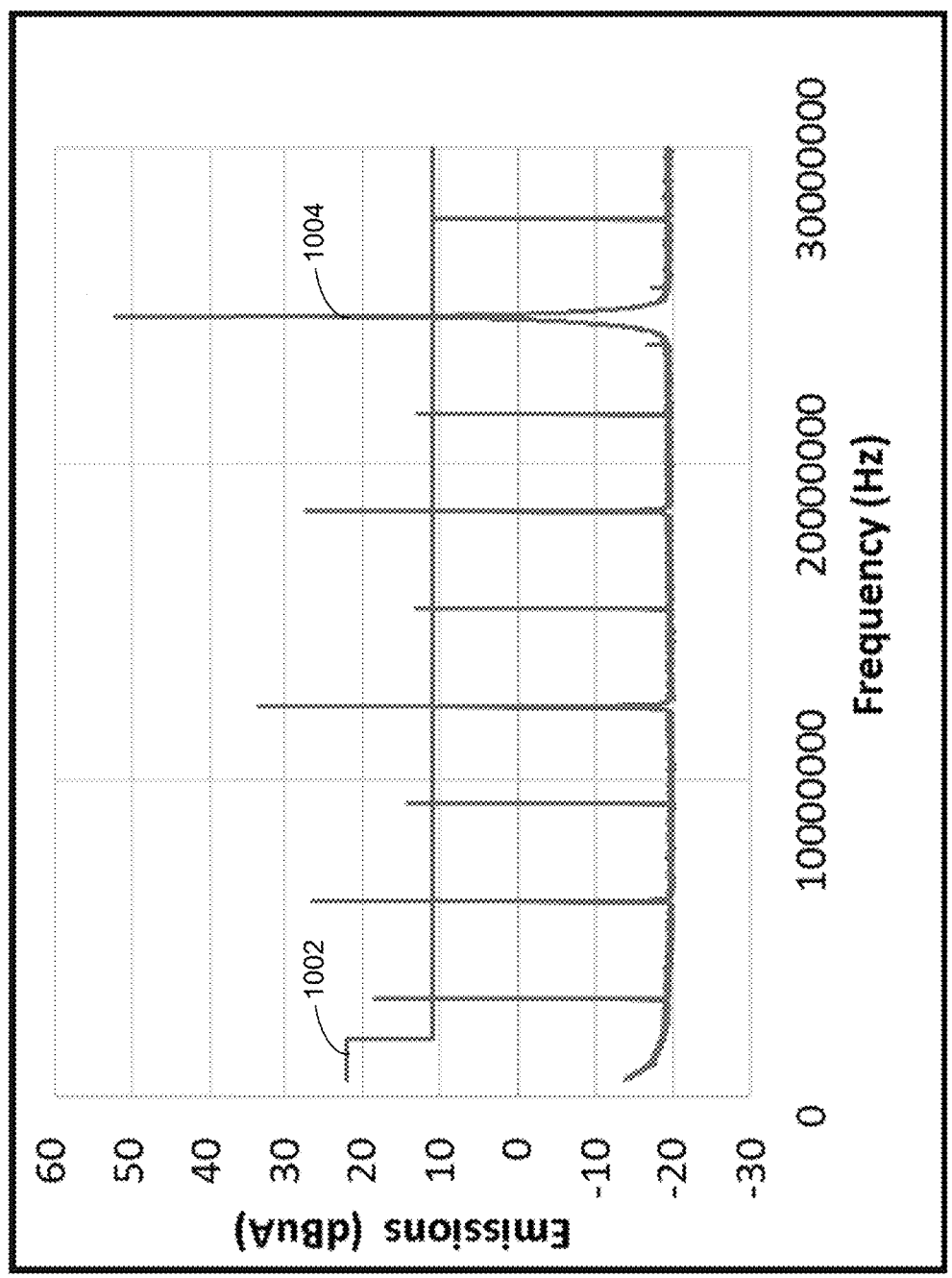
FIG. 10 is a plot illustrating example conducted emissions results.

Referring to FIG. 10, a plot 1000 illustrating example conducted emissions results corresponding to the LC oscillating circuit 800 of FIG. 8 is shown. The maximum conducted emissions line 1002 located at about 10 and 20 dBuA as shown may represent, for example, maximum conducted emissions for an automotive specification at corresponding signal frequencies. The LC oscillating circuit 800 of FIG. 8 may generate conducted emissions (e.g., as indicated by values 1004) at above the automotive specification limit.

Figure 11:
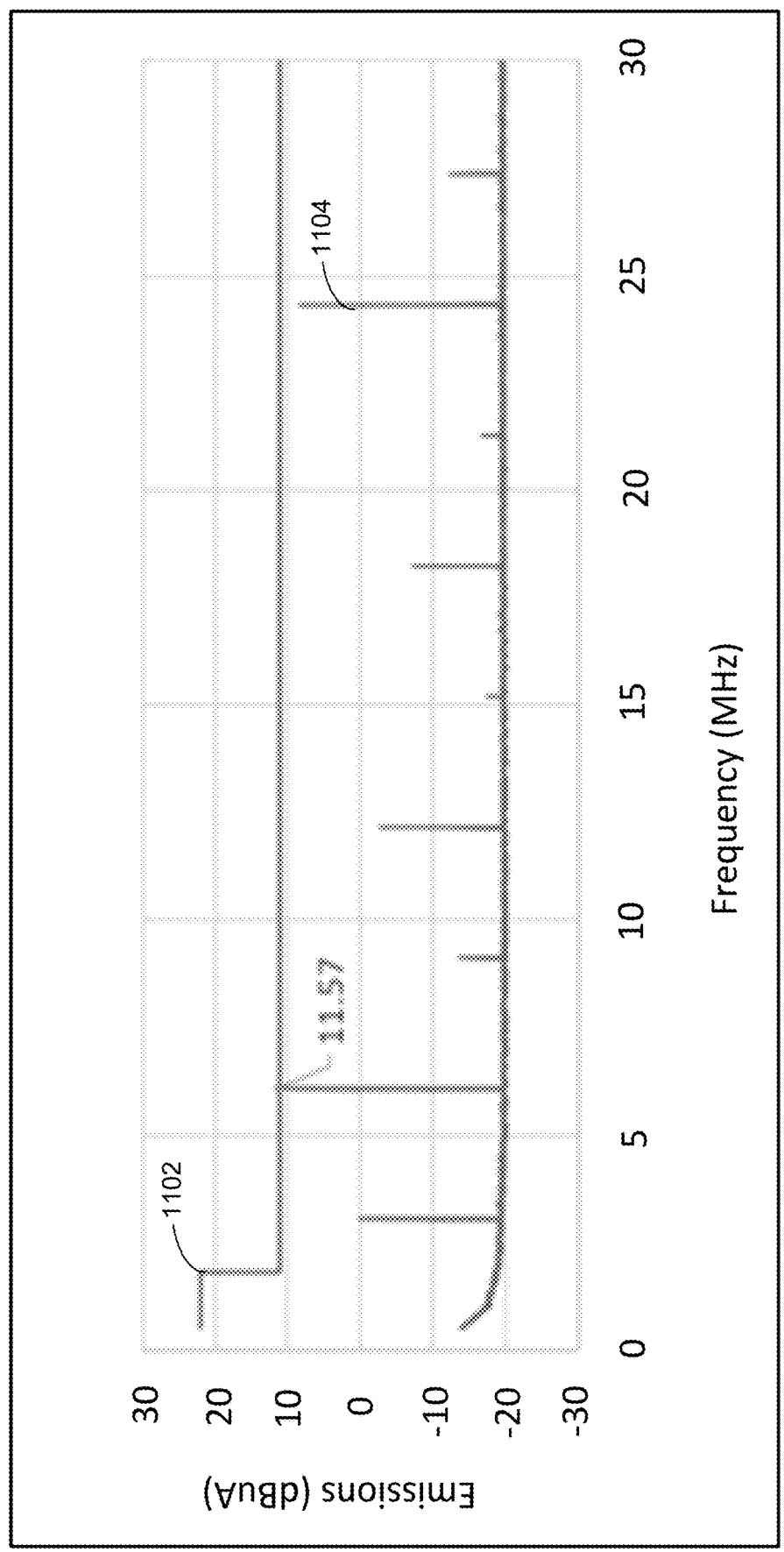
FIG. 11 is a plot illustrating example conducted emissions results in accordance with embodiments of the present disclosure.

Referring to FIG. 11, a plot 1100 illustrating example conducted emissions results, corresponding to the LC oscillating circuit 900 of FIG. 9, in accordance with embodiments of the present disclosure, is shown. The maximum conducted emissions line 1102 located at about 10 and 20 dBuA as shown may represent, for example, maximum conducted emissions for an automotive specification at corresponding signal frequencies. The LC oscillating circuit 900 of FIG. 9 may generate conducted emissions (e.g., as indicated by values 1104) that are generally at or below the automotive specification limit. For example, while most of the values 1104 fall below the automotive specification limit, one value (e.g., 11.57 dBuA) may fall at or slightly above the automotive specification limit.

Figure 12:
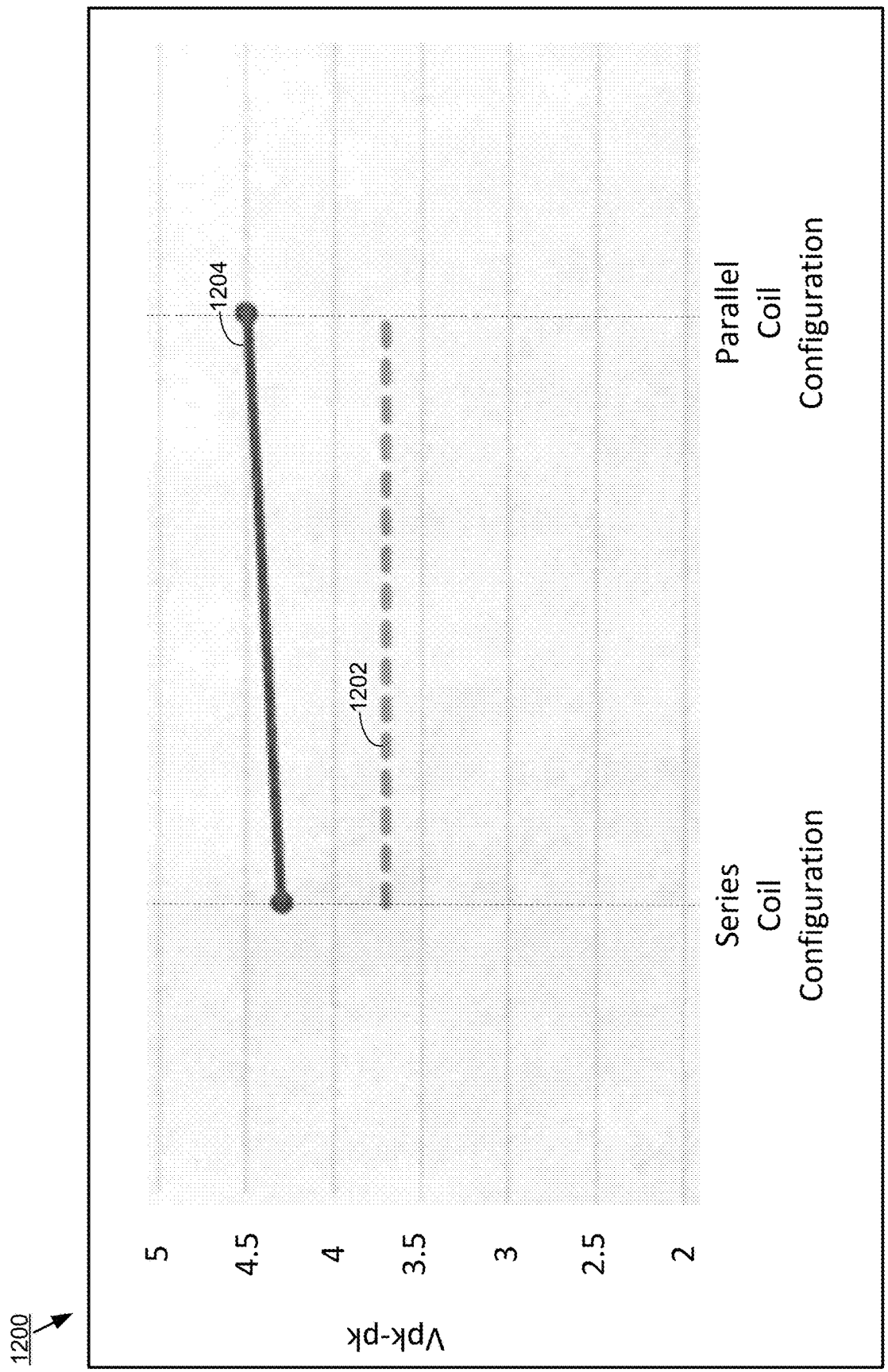
FIG. 12 is a plot associated with example coil configurations in accordance with embodiments of the present disclosure.

Referring to FIG. 12, a plot 1200 associated with example coil configurations in accordance with embodiments of the present disclosure is shown. The plot 1200 illustrates peak to peak voltage of a coil configuration with inductors in series (e.g., the LC oscillating circuit 800 of FIG. 8) and of a coil configuration with inductors in parallel (e.g., the LC oscillating circuit 900 of FIG. 9). The dashed line 1202 may represent a desired (or required) threshold for output voltage which may correspond to signal amplitude or output signal strength and the values 1204 may represent a signal amplitude for each of the coil configurations (e.g., inductors in series and parallel). As can be seen in FIG. 12, in some embodiments, signal amplitude or signal strength may not be reduced as much in the coil configuration with the inductors in parallel as compared to the coil configuration with the inductors in series. Further, as shown in FIG. 11, the coil configuration with the inductors in parallel (e.g., the LC oscillating circuit 900 of FIG. 9) also generally keeps the conducted emissions below the required maximum conducted emissions level. Thus, when viewed together, FIGS. 10-12 illustrate a significant improvement in reducing conducted emissions when using the coil configuration with the inductors in parallel (e.g., the LC oscillating circuit 900 of FIG. 9) as compared to the coil configuration with the inductors in series (e.g., the LC oscillating circuit 800 of FIG. 8), while maintaining signal amplitude or signal strength.

Figure 13A:
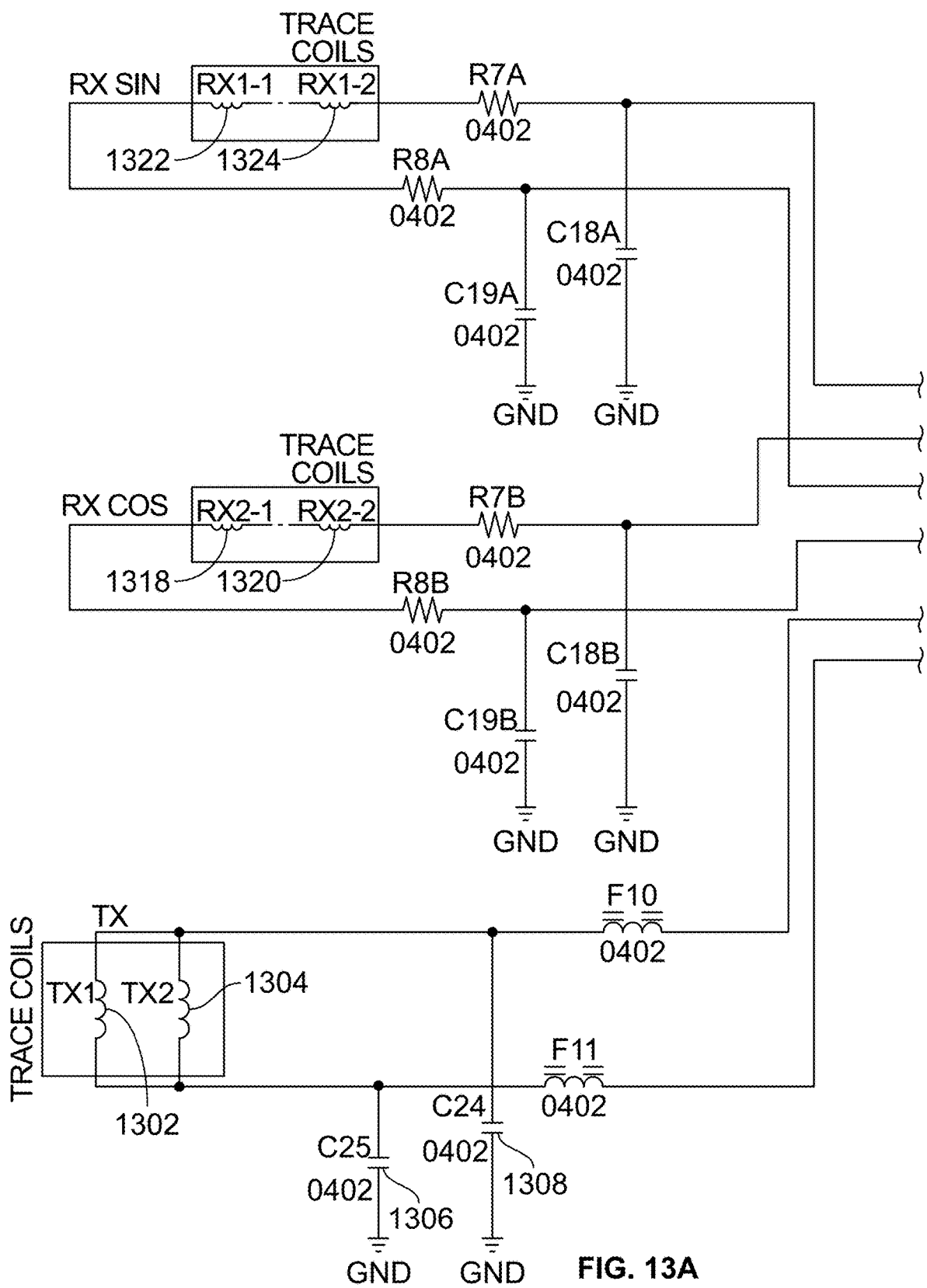
FIG. 13A is a first portion of a schematic illustrating example components of a sensor in accordance with embodiments of the present disclosure.
Figure 13A:
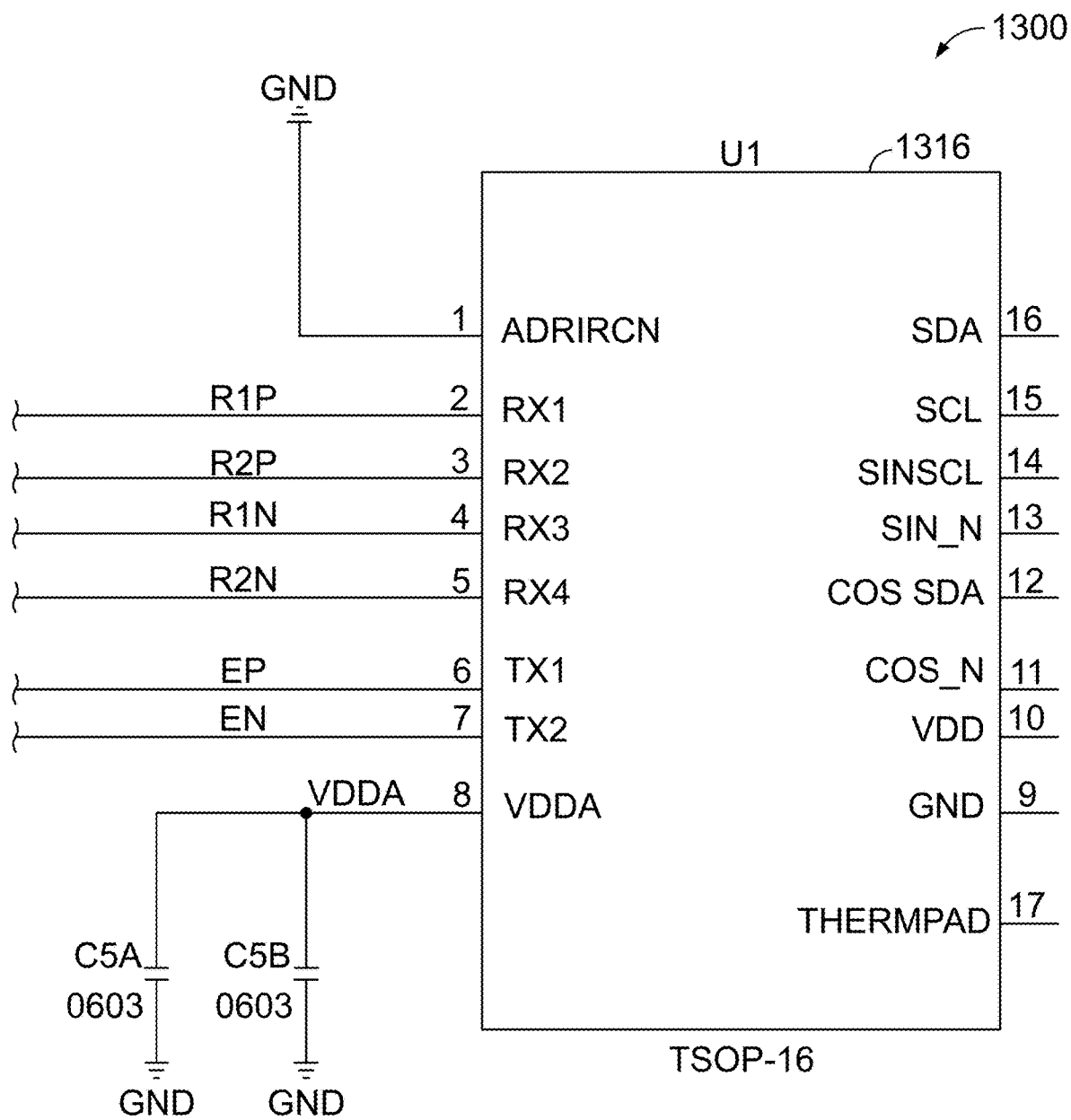

Referring to FIG. 13A, a first portion of a schematic 1300 illustrating example components of a sensor in accordance with embodiments of the present disclosure is shown. FIG. 13A illustrates an IC 1316 of the sensor and components on one side of the IC 1316. For example, an inductive position sensor (e.g., for use in various automotive applications) may include an LC oscillating circuit. The LC oscillating circuit may include a first transmit coil (e.g., transmit coil 1302) of a first layer of a printed circuit board (not shown) arranged in parallel with a second transmit coil (e.g., transmit coil 1304) of a second layer of the printed circuit board. The LC oscillating circuit may further include an oscillator (not shown) implemented via an IC (e.g., IC 1316). The oscillator may be in electronic communication with the first transmit coil (e.g., transmit coil 1302) and the second transmit coil (e.g., transmit coil 1304). The LC oscillating circuit may also include at least one capacitor (e.g., one or more of capacitors 1306 and 1308) and at least one resistor (not shown) positioned between the oscillator (which may be implemented via, e.g., the IC 1316) and the first transmit coil (e.g., transmit coil 1302) and the second transmit coil (e.g., transmit coil 1304).

The sensor may further include a first receive coil (e.g., one or more of receive coils 1318 and 1320) and a second receive coil (e.g., one or more of receive coils 1322 and 1324). The first receive coil (e.g., one or more of receive coils 1318 and 1320) and the second receive coil (e.g., one or more of receive coils 1322 and 1324) may be positioned proximate to at least one of the first transmit coil (e.g., transmit coil 1302) and the second transmit coil (e.g., transmit coil 1304). The positioning of the coils may be such that upon introduction of current to at least one of the first transmit coil (e.g., transmit coil 1302) and the second transmit coil (e.g., transmit coil 1304), at least one of the first receive coil (e.g., one or more of receive coils 1318 and 1320) and the second receive coil (e.g., one or more of receive coils 1322 and 1324) becomes coupled to at least one of the first transmit coil (e.g., transmit coil 1302) and the second transmit coil (e.g., transmit coil 1304) by mutual inductance coupling. Arranging the first transmit coil (e.g., transmit coil 1302) in parallel with the second transmit coil (e.g., transmit coil 1304) may allow, at least in part, maintaining or increasing accuracy of the inductive position sensor as compared to arranging the first transmit coil in series with the second transmit coil (e.g., a discussed above with respect to FIG. 8).

Figure 13B:
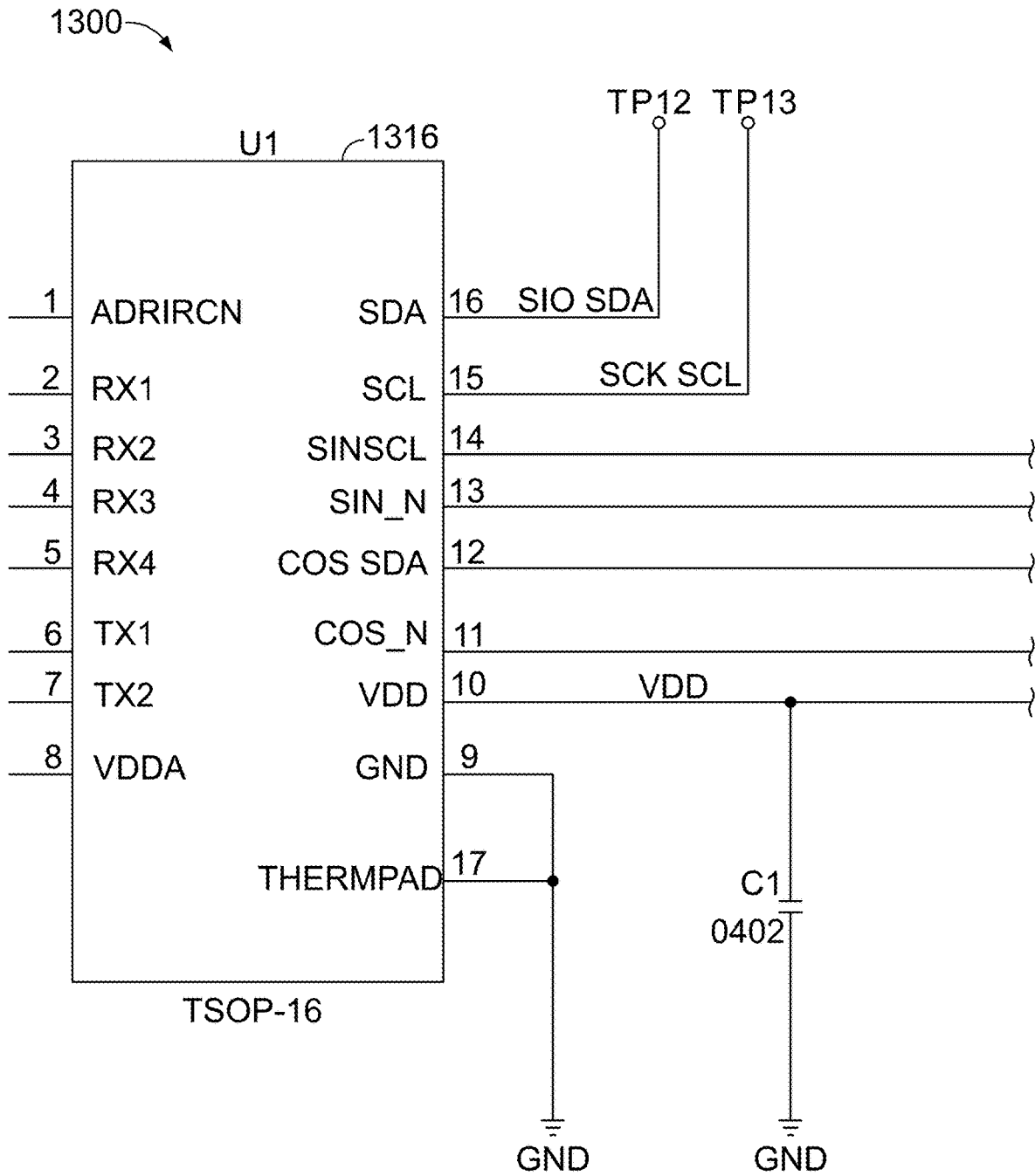
FIG. 13B is a second portion of the schematic illustrating example components of the sensor in accordance with embodiments of the present disclosure.
Figure 13B:
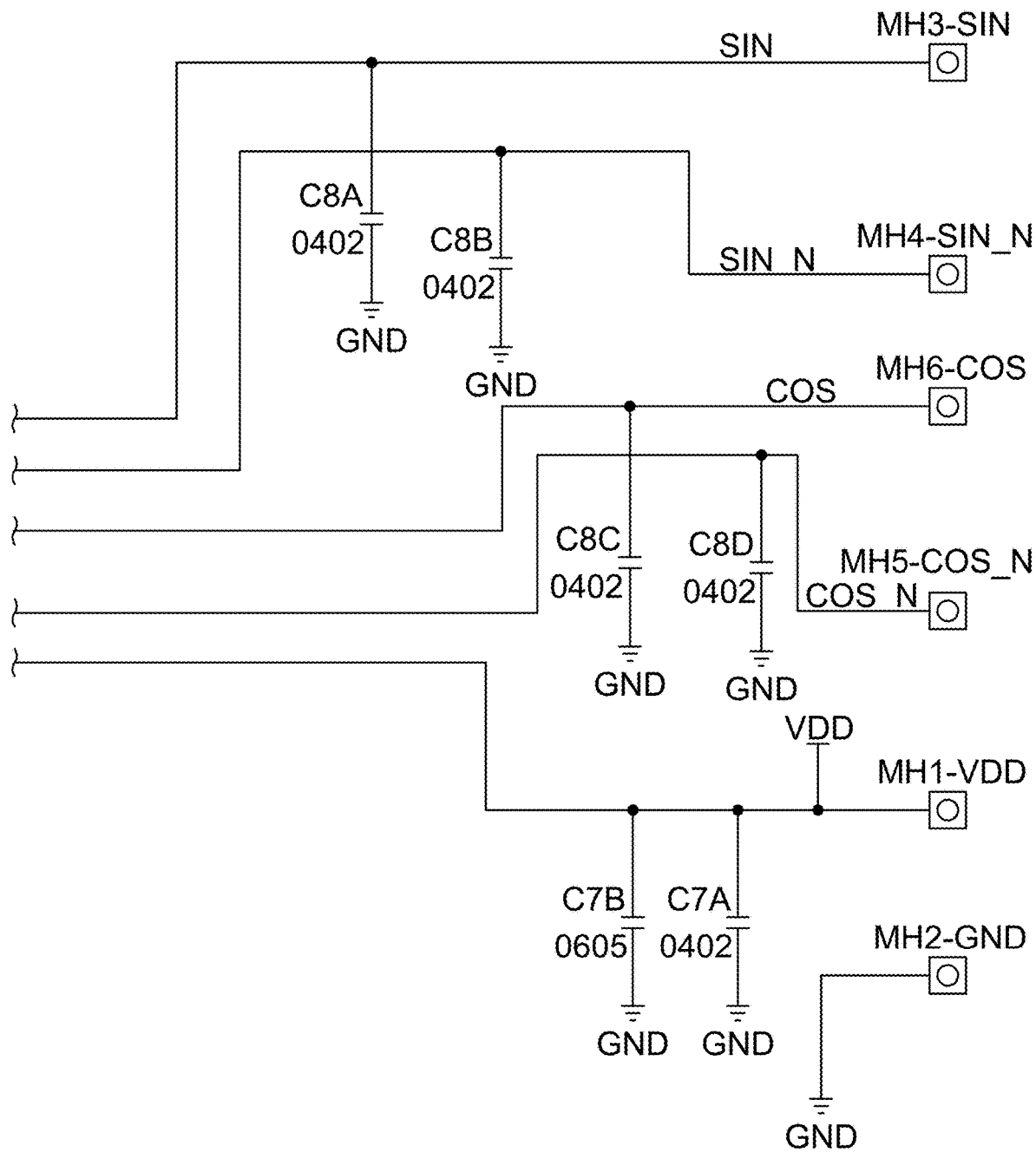

Referring to FIG. 13B, a second portion of the schematic 1300 illustrating example components of the sensor in accordance with embodiments of the present disclosure is shown. FIG. 13B illustrates the IC 1316 of the sensor and components on an opposite side of the IC 1316 as compared to FIG. 13A. For example, various grounds and capacitors are shown. The components of FIGS. 13A and 13B are shown for illustrative purposes only and are not intended to limit the present disclosure.

Figure 14:
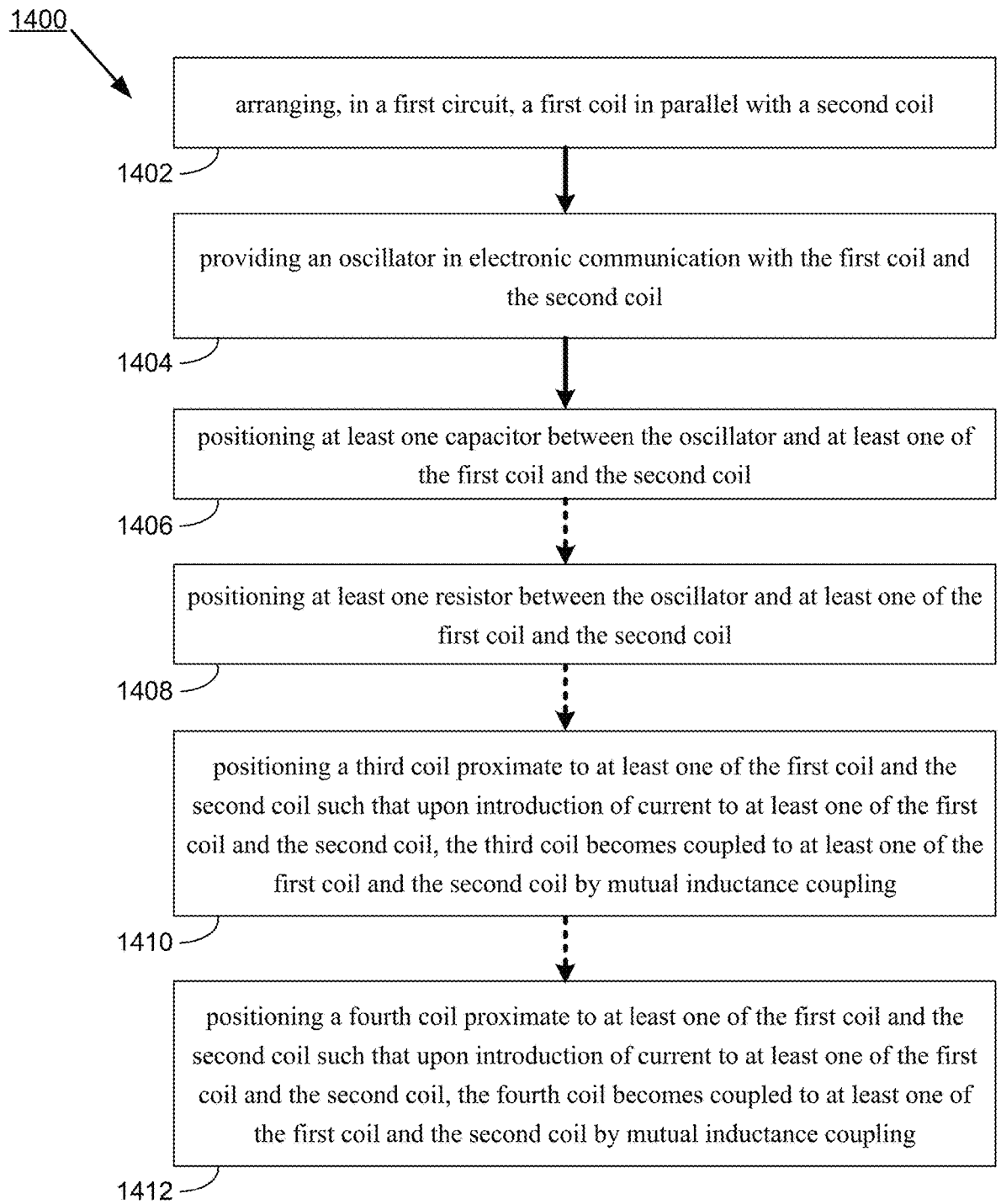
FIG. 14 is a flow chart illustrating example operations in accordance with embodiments of the present disclosure.

Referring to FIG. 14 a flow chart illustrating example operations in accordance with embodiments of the present disclosure is shown. A process 1400 (e.g., for reducing emissions of a sensor and/or increasing sensor accuracy) may include arranging (1402), in a first circuit (e.g., the LC oscillating circuit 900 of FIG. 9), a first coil (e.g., the coil 902 of FIG. 9) in parallel with a second coil (e.g., the coil 904 of FIG. 9). The method may further include providing (1404) an oscillator (e.g., the oscillator 914) in electronic communication with the first coil (e.g., coil 902) and the second coil (e.g., coil 904). The process 1400 may also include positioning (1406) at least one capacitor (e.g., one or more of the capacitors 906 and 908 of FIG. 9) between the oscillator (e.g., oscillator 914) and at least one of the first coil (e.g., coil 902) and the second coil (e.g., coil 904).

In embodiments, the process 1400 may include positioning (1408) at least one resistor (e.g., one or more of resistors 910 and 912 of FIG. 9) between the oscillator (e.g., oscillator 914) and at least one of the first coil (e.g., coil 902) and the second coil (e.g., coil 904). The process 1400 may further include positioning (1410) a third coil (e.g., one or more of coils 1318 and 1320 of FIG. 13A) proximate to at least one of the first coil (e.g., coil 902) and the second coil (e.g., coil 904). The coils may be positioned such that upon introduction of current to at least one of the first coil (e.g., coil 902) and the second coil (e.g., coil 904), the third coil (e.g., one or more of the coils 1318 and 1320) becomes coupled to at least one of the first coil (e.g., coil 902) and the second coil (e.g., coil 904) by mutual inductance coupling. The process 1400 may also include positioning (1412) a fourth coil (e.g., one or more of coils 1322 and 1324 of FIG. 13B) proximate to at least one of the first coil (e.g., coil 902) and the second coil (e.g., coil 904). The coils may be positioned such that upon introduction of current to at least one of the first coil (e.g., coil 902) and the second coil (e.g., coil 904), the fourth coil (e.g., one or more of the coils 1322 and 1324) becomes coupled to at least one of the first coil (e.g., coil 902) and the second coil (e.g., coil 904) by mutual inductance coupling.

As discussed above with regard to FIGS. 8 and 9, arranging the first coil (e.g., coil 902) in parallel with the second coil (e.g., coil 904) may decrease a corresponding inductance of the coils as compared to arranging the first coil (e.g., coil 902) in series with the second coil (e.g., coil 904). Further, decreasing the corresponding inductance may allow for increasing a capacitance of the at least one capacitor (e.g., one or more of the capacitors 906 and 908 of FIG. 9) without falling below an associated resonance frequency threshold (e.g., 2 MHz as described above). Meeting or exceeding the associated resonance frequency threshold (e.g., 2 MHz as described above) may allow for increased filtering of a harmonic frequency produced, at least in part, by the oscillator (e.g., oscillator 914). Increasing the filtering of the harmonic frequency produced, at least in part, by the oscillator (e.g., oscillator 914) may reduce at least one of a conducted emission associated with the oscillator (e.g., oscillator 914) and a radiated emission associated with the oscillator (e.g., oscillator 914). Reducing at least one of the conducted emission and the radiated emission may allow for maintaining or increasing a signal strength associated with the first circuit (e.g., LC oscillating circuit 900 of FIG. 9). Maintaining or increasing the signal strength may allow for maintaining or increasing accuracy of a sensor (e.g., an inductive position sensor) comprising the first circuit (e.g., LC oscillating circuit of FIG. 9).

As discussed above, using the techniques and features described herein, embodiments of the present disclosure may include a transmit coil configuration for an inductive position sensor that allows for achieving optimal emissions performance. The transmit coil configuration (e.g., coils in parallel) may meet functional requirements (e.g., automotive specifications and/or ASIC limitations) as well as maintain sensor signal strength (i.e., without causing signal strength degradation). For example, parallel configuration of transmit coils described herein may achieve low inductance and ESR values, thus allowing use of higher transmit capacitor values. The higher transmit capacitor values may in turn filter or facilitate filtering of electromagnetic emissions from the inductive position sensor while maintaining signal strength.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph (f) for any limitations of any of the claims herein, except for those in which the claim expressly uses the words 'means for' or 'step for' together with an associated function.

Having thus described the disclosure of the present application in detail and by reference to embodiments thereof, it will be apparent that modifications and variations are possible without departing from the scope of the disclosure defined in the appended claims.

What is claimed is:

1. A sensor comprising:
   an inductance-capacitance oscillating circuit comprising:
     a first transmit coil of a first layer of a printed circuit board electrically arranged in parallel with a second transmit coil of a second layer of the printed circuit board;
     an oscillator implemented via an integrated circuit, the oscillator in electronic communication with the first transmit coil and the second transmit coil;
     one or more capacitors;
     one or more resistors; and
     at least one capacitor of the one or more capacitors and at least one resistor of the one or more resistors positioned between the oscillator and the first transmit coil, wherein the first transmit coil is electrically arranged in parallel with the second transmit coil,
     wherein a value of the at least one capacitor of the one or more capacitors is in a range of 900 pF to 3600 pF in order to increase filtering of a harmonic frequency produced, at least in part, by the oscillator.

2. The sensor of claim 1, further comprising:
   a first receive coil positioned proximate to the first transmit coil and the second transmit coil such that upon introduction of current to the first transmit coil and the second transmit coil, the first receive coil becomes coupled to the first transmit coil and the second transmit coil by mutual inductance coupling.

3. The sensor of claim 2, further comprising:
   a second receive coil positioned proximate to the first transmit coil and the second transmit coil such that upon introduction of current to the first transmit coil and the second transmit coil, the second receive coil becomes coupled to the first transmit coil and the second transmit coil by mutual inductance coupling.

4. The sensor of claim 3, the first receive coil corresponds to a sine waveform and the second receive coil corresponds to a cosine waveform.

5. A method comprising:
   electrically arranging, in an inductance-capacitance oscillating circuit, a first transmit coil of a first layer of a printed circuit board in parallel with a second transmit coil of a second layer of the printed circuit board;
   providing an oscillator implemented via an integrated circuit, the oscillator in electronic communication with the first transmit coil and the second transmit coil;
   providing one or more capacitors;
   providing one or more resistors; and
   positioning at least one capacitor of the one or more capacitors and at least one resistor of the one or more resistors between the oscillator and the first transmit coil, wherein the first transmit coil is electrically arranged in parallel with the second transmit coil,
   wherein a value of the at least one capacitor of the one or more capacitors is in a range of 900 pF to 3600 pF in order to increase filtering of a harmonic frequency produced, at least in part, by the oscillator.

6. The method of claim 5, further comprising:
   positioning a first receive coil proximate to the first transmit coil and the second transmit coil such that upon introduction of current to the first transmit coil and the second transmit coil, the first receive coil becomes coupled to the first transmit coil and the second transmit coil by mutual inductance coupling.

7. The method of claim 6, further comprising:
   positioning a second receive coil proximate to the first transmit coil and the second transmit coil such that upon introduction of current to the first transmit coil and the second transmit coil, the second receive coil becomes coupled to the first transmit coil and the second transmit coil by mutual inductance coupling.

8. The method of claim 5, wherein electrically arranging the first transmit coil in parallel with the second transmit coil decreases a corresponding inductance of the first and second transmit coils as compared to electrically arranging the first transmit coil in series with the second transmit coil.

9. The method of claim 8, wherein decreasing the corresponding inductance of the first and second transmit coils allows for increasing a capacitance of the at least one capacitor without falling below an associated resonance frequency threshold.

10. The method of claim 9, wherein meeting or exceeding the associated resonance frequency threshold allows for increased filtering of the harmonic frequency produced, at least in part, by the oscillator.

11. The method of claim 10, wherein increasing the filtering of the harmonic frequency produced, at least in part, by the oscillator reduces at least one of a conducted emission associated with the oscillator and a radiated emission associated with the oscillator.

12. The method of claim 11, wherein reducing at least one of the conducted emission and the radiated emission associated with the oscillator allows for maintaining or increasing the signal strength associated with the inductance-capacitance oscillating circuit, and maintaining or increasing the signal strength allows for maintaining or increasing accuracy of the sensor.

13. An inductive position sensor comprising:
an inductance-capacitance oscillating circuit comprising:
a first transmit coil of a first layer of a printed circuit board electrically arranged in parallel with a second transmit coil of a second layer of the printed circuit board;
an oscillator implemented via an integrated circuit, the oscillator in electronic communication with the first transmit coil and the second transmit coil;
one or more capacitors;
one or more resistors; and
at least one capacitor of the one or more capacitors and at least one resistor of the one or more resistors positioned between the oscillator and the first transmit coil, wherein the first transmit coil is electrically arranged in parallel with the second transmit coil, and
wherein a value of the at least one capacitor of the one or more capacitors is in a range of 900 pF to 3600 pF in order to increase filtering of a harmonic frequency produced, at least in part, by the oscillator; and
a first receive coil and a second receive coil positioned proximate to the first transmit coil and the second transmit coil such that upon introduction of current to the first transmit coil and the second transmit coil, at least one of the first receive coil and the second receive coil becomes coupled to the first transmit coil and the second transmit coil by mutual inductance coupling,
wherein electrically arranging the first transmit coil in parallel with the second transmit coil allows, at least in part, maintaining or increasing accuracy of the inductive position sensor as compared to electrically arranging the first transmit coil in series with the second transmit coil.

* * * * *